United States Patent
Cho et al.

(10) Patent No.: US 6,674,250 B2
(45) Date of Patent: Jan. 6, 2004

(54) BACKLIGHT INCLUDING EXTERNAL ELECTRODE FLUORESCENT LAMP AND METHOD FOR DRIVING THE SAME

(75) Inventors: Guang-Sup Cho, Seoul (KR); Eun-Ha Choi, Seoul (KR)

(73) Assignee: Guang-Sup Cho, Seoul (KR)

( * ) Notice: Subject to any disclaimer, the term of this patent is extended or adjusted under 35 U.S.C. 154(b) by 0 days.

(21) Appl. No.: 09/823,336

(22) Filed: Mar. 30, 2001

(65) Prior Publication Data

US 2002/0021564 A1 Feb. 21, 2002

Related U.S. Application Data

(63) Continuation-in-part of application No. 09/678,082, filed on Oct. 3, 2000.

(30) Foreign Application Priority Data

| Apr. 15, 2000 | (KR) | 2000-19887 |
| Jun. 13, 2000 | (KR) | 2000-32565 |
| Aug. 28, 2000 | (KR) | 2000-50025 |
| Dec. 28, 2000 | (KR) | 2000-83512 |

(51) Int. Cl.$^7$ ............................................. G05F 1/00
(52) U.S. Cl. ..................... 315/291; 315/246; 362/260; 362/265; 362/267; 313/624; 313/607
(58) Field of Search ................. 315/246, 291, 315/209 R, 276, 278; 362/260, 263, 265, 267, 327, 330, 355; 313/494, 623, 624, 607

(56) References Cited

U.S. PATENT DOCUMENTS

| 4,447,756 A | | 5/1984 | Kohmoto et al. ............ 313/487 |
| 4,714,983 A | | 12/1987 | Lang ........................... 362/27 |
| 4,767,965 A | | 8/1988 | Yamano et al. ............. 313/491 |
| 5,043,627 A | * | 8/1991 | Fox .............................. 313/491 |
| 5,147,127 A | * | 9/1992 | Honda et al. ................. 349/70 |
| 5,343,155 A | | 8/1994 | Kejariwal et al. ........... 324/522 |
| 5,619,351 A | | 4/1997 | Funamoto et al. ............ 349/61 |
| 5,659,410 A | | 8/1997 | Koike et al. .................. 349/82 |
| 5,672,936 A | * | 9/1997 | Hatsutori et al. ............ 313/352 |
| 5,815,277 A | | 9/1998 | Zare et al. ................... 356/440 |
| 5,899,552 A | | 5/1999 | Yokoyama et al. ........... 362/31 |
| 5,971,567 A | | 10/1999 | Van Duijneveldt .......... 362/296 |
| 5,975,722 A | | 11/1999 | Van Duijneveldt .......... 362/296 |
| 6,023,131 A | | 2/2000 | Okita .......................... 315/291 |
| 6,042,241 A | | 3/2000 | Lengyel ....................... 362/84 |
| 6,050,704 A | * | 4/2000 | Park ........................... 362/255 |
| 6,053,619 A | | 4/2000 | Nakamura et al. ............ 362/31 |
| 6,120,160 A | | 9/2000 | Nakagawa .................... 362/97 |

FOREIGN PATENT DOCUMENTS

JP          7945103          2/1995

OTHER PUBLICATIONS

Fundamental Research on Mercuryless Fluorescent Lamps II; Masafumi Jinno, Hisayoshi Kurokawa and Mashauru Aono, Jul. 1999.

* cited by examiner

*Primary Examiner*—Haissa Philogene
(74) *Attorney, Agent, or Firm*—Cha & Reiter

(57) ABSTRACT

The present invention discloses a backlight including external electrode fluorescent lamps and a method for driving the backlight. The backlight includes fluorescent lamps having external electrodes made of an electrically conductive material for wrapping the outer peripheral surfaces including edge cross-sections on both ends of a glass tube with a layer of fluorescent substance applied thereon. The backlight is constructed in a manner that a plurality of such fluorescent lamps are installed at the outer portions of a plastic light guide, and an alternating current type power source is applied from the outside to the fluorescent lamps by installing a plurality of the fluorescent lamps between a reflecting plate and a diffusing plate and electrically connecting them with one another. The backlight of the present invention is driven by a square wave from a switching inverter, and is characterized by the use of an overshooting waveform and a self-discharge effect favorable to an initial discharge, thereby driving it using a low frequency of several dozen kHz and thus realizing high luminance and high efficiency.

25 Claims, 16 Drawing Sheets a) Belt type b) Metal Capsule-bonding type c) A type in which spaces at both ends of the glass tube are bulged d) A type in which spaces at both ends of the glass tube are bulged

BACKLIGHT INCLUDING EXTERNAL ELECTRODE FLUORESCENT LAMP AND METHOD FOR DRIVING THE SAME

CROSS REFERENCE TO RELATED APPLICATION

This application is a CIP application of U.S. patent application Ser. No. 09/678,082 filed on Oct. 3, 2000 and entitled "Fluorescent Lamp and Backlight Employing the Same", having the same priority date as the present application, assigned to the same assignee, and herein incorporated by reference.

BACKGROUND OF THE INVENTION

1. Field of Invention

The present invention relates to a fluorescent lamp with external electrodes and a backlight luminaire, and more particularly, to an improved backlight including an external fluorescent lamp in which the external electrodes are installed at both ends of the fluorescent lamp, and a method for driving the backlight.

2. Background of Invention

In general, a flat panel display is categorized into two types: an active lighting type and a passive lighting type. The active lighting type includes a flat panel cathode-ray tube, a plasma display panel, an electronic active lighting element, a fluorescent display, an active lighting diode, etc., where as the passive lighting type includes a liquid crystal display.

In the liquid crystal display, an image is formed not by a self-illumination provided by the incident light from the outside of the liquid crystal panel. To accomplish this, a backlight luminaire is typically installed at the rear end of the liquid crystal panel to enable the illumination. Hence, the image formed on the liquid crystal display can be seen even in dark places. It is highly desirable to produce a thin, light weight, and low-cost backlight luminaire that has high luminance, high efficiency, uniform luminance, and longer operation life. Highly efficient and long lasting lamp is desirable for use in notebook PCs to reduce the electrical power consumption, whereas high luminant lamp is desirable for use in regular PC monitors and TVs.

Two widely used methods as a backlight luminaire are a cold cathode fluorescent lamp (CCFL) and a flat fluorescent lamp. The CCFLs can be categorized into two types: (i) an edge light arrangement utilizing a plastic light guide, and (ii) a direct light arrangement in which repeated light sources are disposed on a plane in accordance with the arrangement of the light source with respect to the display face.

The above CCFL operates at a high luminance of about 30,000 cd/m$^2$, and as a result has a shorter lamp life span. In particular, the edge light type is not suitable for a large screen panel as the luminance of the panel is weak even though the CCFL itself is highly luminescent. In the direct light type, it is impossible to connect the CCFLs in parallel arrangement and drive the backlight using a conventional inverter as the distance between the CCFLs has to be provided within a limited screen space to achieve desired illumination.

Meanwhile, the conventional flat-fluorescent lamp requires sufficient thickness to prevent the substrate made of glass from being damaged as the pressure between the upper and lower substrates is lower than the atmospheric pressure. As a result, the weight of the lamp tend to increase. In addition, in the conventional flat-fluorescent lamp, partitions and spacers in the form of a bead or cross are typically interposed between the upper and lower substrates in order to enlarge a screen area; thus, a uniform luminance cannot be achieved as the striped patterns of the partitions appear on the screen.

Accordingly, there is a need to develop a backlight source that is capable of ensuring high luminance and efficiency when placed in the back of a liquid crystal display.

Currently, there are various external electrode fluorescent lamp (EEFL) that are available as shown in FIG. 11. Although the EEFL tends to have a longer operation life than the CCFL, it has not been widely accepted as a backlight source due to the EMI and low efficiency. Moreover, the EEFL requires a larger power source using a high frequency of about several MHz. Furthermore, the EEFL has not been employed as a backlight source as its luminance and efficiency tend to be low as the LC-resonance type inverter designed for driving the CCFL is used for driving the EEFL.

FIG. 11 shows different types of the conventional external electrode fluorescent lamps. In particular, FIG. 11(a) illustrates a belt type external electrode with a pairs of the belt type electrodes installed on the cylinder of the glass tube driven typically at a high frequency of several MHz. The belt type EEFL (a) has an advantage in that additional electrodes can be installed even at an intermediate portion of the glass tube. This type of external electrode fluorescent lamps can attain a high luminance of several 10,000 cd/m$^2$ by driving the lamps at a high frequency of several MHz. Moreover, the installation of the belt type electrodes in the intermediate portion of the glass tube is helpful to operate even at a higher frequency. However, there are some drawbacks in that a uniform and thin panel cannot be realized due to a decrease in the luminance of the electrode portion. In addition, the high frequency driving causes the undesirable EMI to be emitted, thus the efficiency of the electrodes becomes low. Furthermore, the high frequency power source is undesirable in designing a compact device using such a power source.

FIG. 11(b) illustrates a conventional external electrode in which metal capsules are bonded at the ends of the glass tube, and ferrodielectrics are applied to the inside of the metal capsules. This type of electrode is disclosed in U.S. Pat. No. 2,624,858 (Jun. 6, 1953) and typically employed to prevent the electric capacitive voltage drop caused by the thickness of the glass tube. However, the bonded portions of the electrodes can be easily damaged since coefficient of the thermal expansion of the glass tubes is different from that of the metal. However, if a fine glass tube, i.e., a cold cathode-ray tube, is used as the backlight source with an outer diameter of 2.6 mm and thickness of 0.5 mm or less, the metal capsules bonded to the glass tubes, as shown in FIG. 11(b), does not have to be used since the electric capacitive voltage drop due to the thickness of the glass tube is small.

FIGS. 11(c) and (d) illustrate lamps where the spaces at both ends of the glass tube are larger for achieving high luminance and efficiency. This type of external electrode is disclosed in U.S. Pat. Nos. 1,612,387 (Nov. 28, 1926) and 1,676,790 (Jul. 10, 1928). When the spaces at both ends of the glass tube are configured as shown in FIG. 11, the luminance and efficiency of the lamp increase. However, it is difficult to apply this type of structure to manufacture a fine tube to be used in a compact device.

FIG. 12 is a prior art circuit diagram showing an IC for driving the CCFL for use in the LCD panel. The circuit includes a lamp driving IC 100 having a plurality of I/O pins, a main electrical power circuit portion 120 having a half bridge circuit, and a lamp 140. The lamp driving IC 100 comprises a first pin 1 connected to an input voltage terminal; a second pin 2 connected to a predetermined minimum frequency terminal; a third pin 3 connected to a predetermined maximum frequency terminal; a fourth pin 4 connected to a ground voltage terminal; a fifth pin 5 connected to a feedback ground terminal; a sixth pin 6 connected to a predetermined comparative terminal; a seventh pin 7 connected to a predetermined internal high voltage terminal; and, a eighth pin 8 connected to a predetermined external control signal terminal for determining ON/OFF of the IC circuit. The main electrical power circuit portion 120 comprises a half bridge circuit which responds to the output signal of the predetermined pin of the lamp driving IC 100 and includes a plurality of passive elements. The lamp 140 is driven in response to a predetermined output signal of the main electrical power circuit portion 120.

As shown in FIG. 12, the power is supplied to the CCFL employed in the LCD backlight by a means of an inverter. The function of an inverter is to obtain a high voltage required for initiation and maintenance of the CCFL discharge from a low alternating voltage of several ten kHz obtained from the LC-resonance type inverter by a boosting transformer. Here, the waveform outputted from the inverter takes the shape of sine wave. This LC-resonance type inverter is helpful in designing a simple and highly efficient device. On the other hand, it is impossible to connect the CCFLs in parallel arrangement and drive the CCFLs using a single inverter. To this end, the backlight in the form of a direct light or plastic light guide is combined with the CCFLs, but requires the number of the inverter to correspond to the number of the CCFLs.

The direct light backlight, in which a plurality of the external electrode fluorescent lamps are disposed at the edge areas or on a plane of the plastic light guide, can be driven using a single inverter by connecting the EEFLs in parallel. The reason is that real current does not flow to the electrode as the electrode for the EEFL is not exposed at the discharge space. Thus, the wall charges are collected on both electrode portions. The discharge at both ends of the lamp is interrupted by the formation of a reverse voltage due to the wall charges. Then, another lamp is discharged, and likewise other wall charges are formed and discharged thereafter. Hence, a plurality of lamps can emit light using a single inverter. However, the sine waves generated by an inverter and used for driving the CCFLs cannot efficiently control the wall charges; thus, it produces much lower luminance and efficiency than that of the EEFL having a single tube. In addition, when a plurality of EEFLs interconnected in parallel are driven by a single inverter, the number of active lighting EEFLs is limited as the time period to which a high voltage is applied during one cycle is limited. Therefore, a uniform luminance cannot be realized when a number of the EEFLs are disposed in a plane as a backlight source.

As mentioned above, even if the EEFLs can be driven by the LC-resonance type inverter of several ten kHz to drive the CCFL, the backlight consists of the EEFL cannot be efficiently realized. Furthermore, when adopting the conventional high frequency of the EEFLs at several MHz, the problems of EMI, low efficiency and miniaturization of power source, etc. cannot be easily overcome.

SUMMARY OF INVENTION

The present invention relates to a backlight source including external electrode-type fluorescent lamps capable of being driven in a parallel connection, wherein the external electrodes formed at electrodeless glass tubes on the outer portions of a plastic light guide.

The present invention provides external electrode fluorescent lamps capable of obtaining high luminance and efficiency using a low frequency of 100 kHz or lower.

The present invention provides partition-type fluorescent lamps used as a backlight source, wherein the plurality of fluorescent lamps with external electrodes are disposed between the upper and lower substrates and used as partitions. The present invention is contemplated to solve the problems of driving the backlight employing the fluorescent lamps mentioned above and driving the backlight made by arranging these lamps in a plane orientation.

According to one aspect of the present invention, the inventive external electrode fluorescent lamp comprises a glass tube into which a discharge gas is injected, wherein the inner peripheral wall is coated with a layer of fluorescent substance and both ends of the tubes are then hermetically sealed; and, end-cap type external electrodes configured to have an L-shape, a C-shape, a helical shape or a wave shape to wrap both ends of the glass tube.

According to another aspect of the present invention, the inventive backlight source includes a plastic light guide; fluorescent lamps disposed at the edges of the plastic light guide and includes glass tubes into which a discharge gas is injected and the inner peripheral walls are coated with a layer of fluorescent substance, wherein both ends of the glass tubes are hermetically sealed; end-cap type external electrodes for wrapping both ends of the glass tubes; and, a switching inverter connected to the external electrodes for applying square wave signals with a frequency of 100 kHz or lower to the external electrodes. The external electrode fluorescent lamps include a plurality of external electrode fluorescent lamps interconnected in parallel.

According to another aspect of the present invention, the inventive backlight source includes a plurality of external electrode fluorescent lamps interconnected in parallel and includes glass tubes into which a discharge gas is injected, wherein the inner peripheral walls are coated with a layer of fluorescent substance and both ends of the glass tubes are then hermetically sealed; end-cap type external electrodes for wrapping both ends of the glass tubes; electrode connecting lines for connecting the end-cap type external electrodes of the plurality of external electrode fluorescent lamps in parallel; a reflecting plate; a diffusing plate; and, a switching inverter connected to the electrode connecting lines for applying square wave signals with a frequency of 100 kHz or lower to the electrode connecting lines. The reflecting plate further includes a plurality of triangular stands interposed between the external-electrode fluorescent lamps. The reflecting plate is shaped in wave form for wrapping the external electrode fluorescent lamps. The backlight further includes a plastic light guide having diffusing grooves in which the external electrode fluorescent lamps are seated. The reflecting plate is in the form of triangular sawteeth, and the external electrode fluorescent lamps are disposed along the triangular sawteeth.

According to another aspect of the present invention, the inventive backlight source includes a plurality of glass tubes into which a discharge gas is injected, wherein the inner peripheral walls are coated with a layer of fluorescent substance and both ends of the glass tubes are then hermetically sealed; socket-type multiple capsule electrode structures having a plurality of parallel-connected external electrode with which the glass tubes are coupled; a reflecting plate; a diffusing plate; and, a switching inverter connected to the socket-type multiple capsule electrode structures for applying square wave signals with a frequency of 100 kHz or lower to the socket-type multiple capsule electrode.

According to another aspect of the present invention, the inventive backlight source includes external electrode fluorescent lamps with external electrode portions thereof alternately disposed and transversely overlapped with each other in the middle of a panel; a reflecting plate; a diffusing plate; and, a switching inverter connected to the external electrodes for applying square wave signals with a frequency of 100 kHz or lower to the external electrodes. Each of the fluorescent lamps includes a glass tube into which a discharge gas is injected, wherein the inner peripheral wall is coated with a layer of fluorescent substance and both ends of the glass tube are hermetically sealed; and, capsule type external electrodes for wrapping both ends of the glass tube. The external electrodes of the external electrode fluorescent lamps are made of conductive transparent electrode materials.

According to another aspect of the present invention, the inventive backlight source includes an upper substrate with an upper layer of fluorescent substance applied on a bottom surface of the upper substrate; a lower substrate with a lower layer of fluorescent substance applied on a top surface of the lower substrate and installed to be opposite end of the upper substrate; edge supporting stands interposed between the upper and lower substrates for hermetically sealing the upper and lower substrates; external electrode fluorescent lamps installed at a predetermined interval above the lower substrate; electrodes formed at the corresponding outer surfaces on both sides of the assembled upper and lower substrates, respectively, and connected to the electrode connecting lines to which an alternating current type power source is applied; a switching inverter connected to the electrodes for applying square wave signals with a frequency of 100 kHz or lower to the electrodes; and, a discharge gas injected into an inner space upon sealing the upper and lower substrates. Each of the fluorescent lamps includes a glass tube into which a discharge gas is injected, wherein the inner peripheral wall is coated with a layer of fluorescent substance and both ends of the glass tube are hermetically sealed; and, capsule type external electrodes for wrapping both ends of the glass tube. The external electrode fluorescent lamps are not connected to the electrodes but disposed within the upper and lower substrates in a floating state.

According to further aspect of the present invention, the inventive backlight source includes an upper substrate with an upper layer of fluorescent substance applied on a bottom surface of the upper substrate; a lower substrate with a lower layer of fluorescent substance applied on a top surface of the lower substrate and installed to be opposite to the upper substrate; edge supporting stands interposed between the upper and lower substrates for hermetically sealing the upper and lower substrates; multiple capsule type electrode structures constructed by coupling upper and lower electrodes having surfaces coated with ferrodielectrics and grooves at a predetermined interval and then installed respectively on the inner portions at both ends of the lower substrate; glass tubes arranged in parallel coupled with, the grooves of the multiple capsule type electrode structures installed respectively on the inner portions at both ends of the lower substrate; electrode connecting lines connected to the multiple-capsule type electrode structures; a switching inverter connected to the electrode connecting lines for applying square wave signals with a frequency of 100 kHz or lower to the electrode connecting lines; and, a discharge gas injected into an inner space upon sealing the upper and lower substrates. Each of the glass tubes has a discharge gas injected therein and an inner peripheral wall coated with a layer of fluorescent substance. Both ends of each of the glass tube are then hermetically sealed.

According to further aspect of the present invention, the inventive switching inverter constitutes a bridge circuit by four FETs A, B, C and D. A DC is applied to the drains of the FETs A and C; sources of the FETs B and C are grounded; sources of FETs A and C are connected to the drains of the FETs B and D, respectively; and, a boosting transformer is connected between a connection point of the FETs A and B and a connection point of the FETs C and D. A square wave outputted from the switching inverter includes an overshooting.

According to further aspect of the present invention, the inventive driving method for driving a backlight with a plurality of external electrode fluorescent lamps interconnected in parallel comprises the steps of: dividing the plurality of external electrode fluorescent lamps into a plurality of predetermined regions; connecting identical electrode connecting lines to external electrodes of the fluorescent lamps in the respective divided regions, respectively; connecting switching inverters for outputting square waves to the electrode connecting lines connected to the respective divided regions, respectively; applying an identical gate signal to each of the switching inverters; and, supplying the electrode connecting lines with the in-phase square waves from the switching inverters in response to the gate signal. The switching inverter constitutes a bridge circuit by four FETs A, B, C and D. A DC is applied to the drains of the FETs A and C, sources of the FETs B and C are grounded, sources of the FETs A and C are connected to the drains of the FETs B and D, respectively, and a boosting transformer is connected between a connection point of the FETs A and B and a connection point of the FETs C and D.

DETAILED DESCRIPTION FOR PREFERRED EMBODIMENT

Hereinafter, a fluorescent lamp according to an exemplary embodiment of the present invention and a backlight source employing the fluorescent lamp will be explained in detail.

Figure 1A:
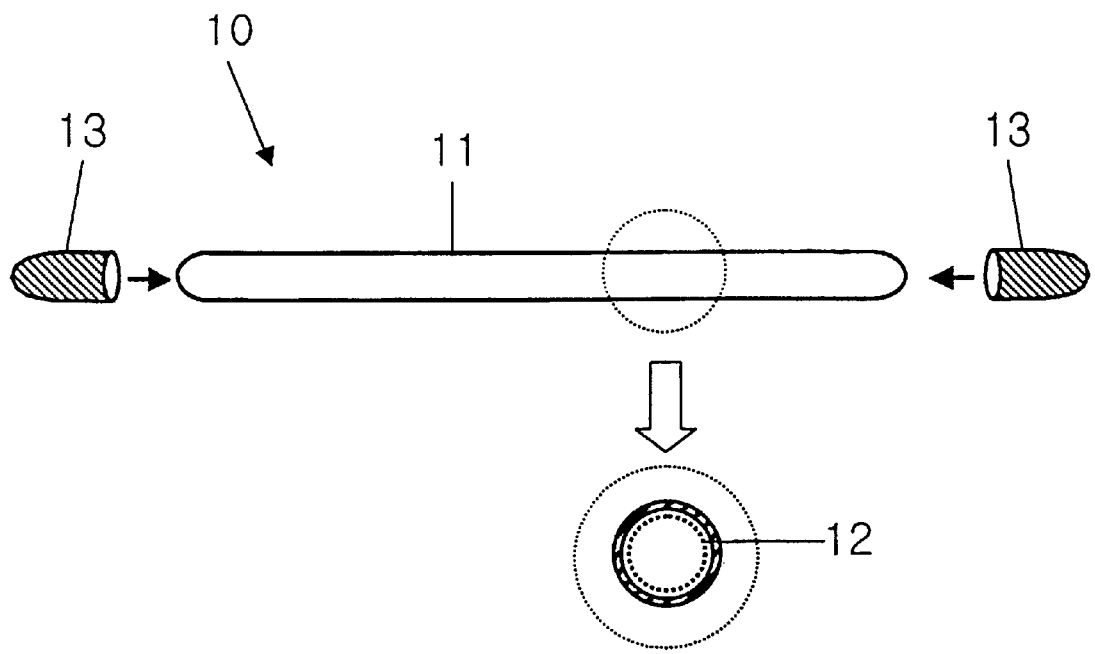
FIG. 1a is a perspective view of an end-cap external electrode fluorescent lamp (EEFL) according to a first embodiment of the present invention.
Figure 1B:
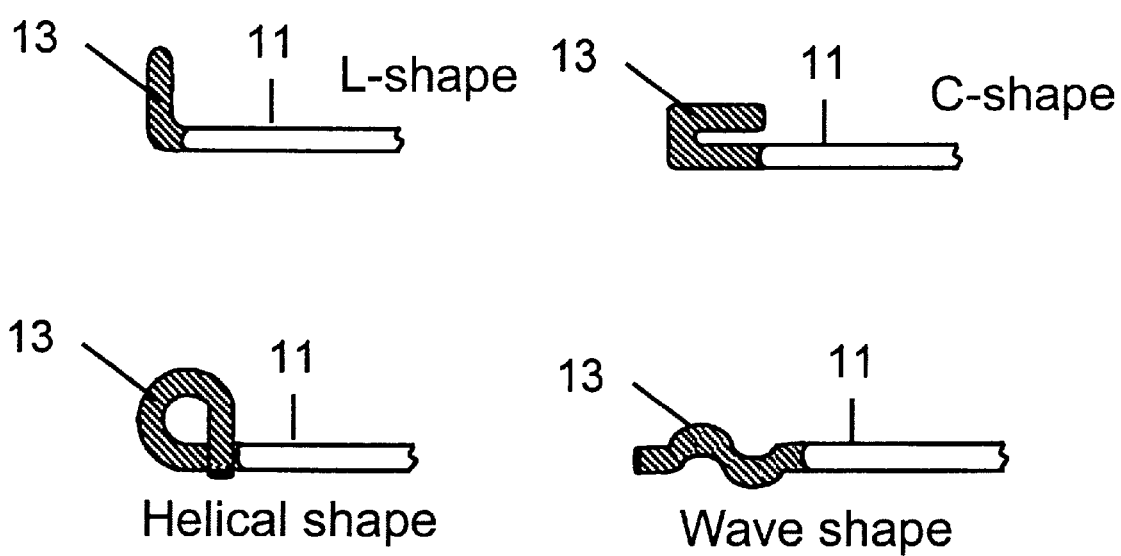
FIG. 1b is a partial perspective view of the external electrode fluorescent lamps (EEFL) in different shapes according to the first embodiment of the present invention.

FIG. 1 shows the fluorescent lamp 10 according to an exemplary embodiment of the present invention. Referring to FIG. 1, the fluorescent lamp 10 includes a cylindrical glass tube 11. The fluorescent substance 12 is provided along the inner peripheral wall of the glass tube 11. After the fluorescent substance 12 is applied inside the glass tube 11, a discharge gas consists of an inert gas, mercury (Hg), etc. mixed with one another is injected into the glass tube 11, then both ends of the glass tube 11 are sealed. The glass tube 11 may include a cross-sectional area having a cylindrical shape, a flat cylindrical shape, or an integrally bent multi-cylindrical shape.

Referring to FIG. 1a, the external electrodes 13 with different shapes are respectively formed at the opposite ends of the sealed glass tube 11. In the embodiment of the present invention, a sufficient length of the cap should be secured to achieve high luminance and high efficiency by the external electrode 13. To accomplish this, the external electrode 13 is formed by elongating the end-cap electrode, or by bending both ends of the glass tube as shown in FIG. 1a. The shape of the electrode includes various shapes, such as a "L"-shape, "C"-shape, helical shape, and wave shape.

The external electrodes 13 are made of electrically conductive material that completely wraps around the both ends of the glass tube 11. Fluorescent substance applied to the inner portion of the glass tube 11 but not applied to the external electrode 13. Here, the external electrodes 13 may be formed by attaching metal tapes or metal capsules to both ends of the glass tube 11, or by dipping both ends of the glass tube into a metal solution. It is preferable that the external electrodes 13 are made of electrically conductive material with a low electric resistance, such as Al, Ag, Cu, etc.

In the present invention, if the glass tube 11 is substantially long, the end caps disposed at both ends of the glass tube 14 are needed. A belt type electrode at an intermediate portion of the glass tube 11 is not required as in the prior art. The reason is that the longer the distance between opposite ends of the electrode, the luminance and efficiency of the external electrode fluorescent lamp (EEFL) tend to be more effective. In addition, the prior art belt electrode is unfavorable since the luminance is not uniform due to an electrode portion disposed at the intermediate position of the glass tube.

In order to increase life of the glass tube 11 and to improve the generation of secondary electrons, ferrodielectrics may be applied to the inner side of the external electrode 13 and the glass tube 11. Alternatively, a separate structure coated with a dielectric may be inserted into both ends of the glass tube 11. Furthermore, in addition to ferrodielectrics, magnesium oxide or calcium oxide, etc., which can serve as a protective film and enable the electron to discharge easily may be applied to the inner side of the external electrode 13 and the glass tube 11.

Figure 2:
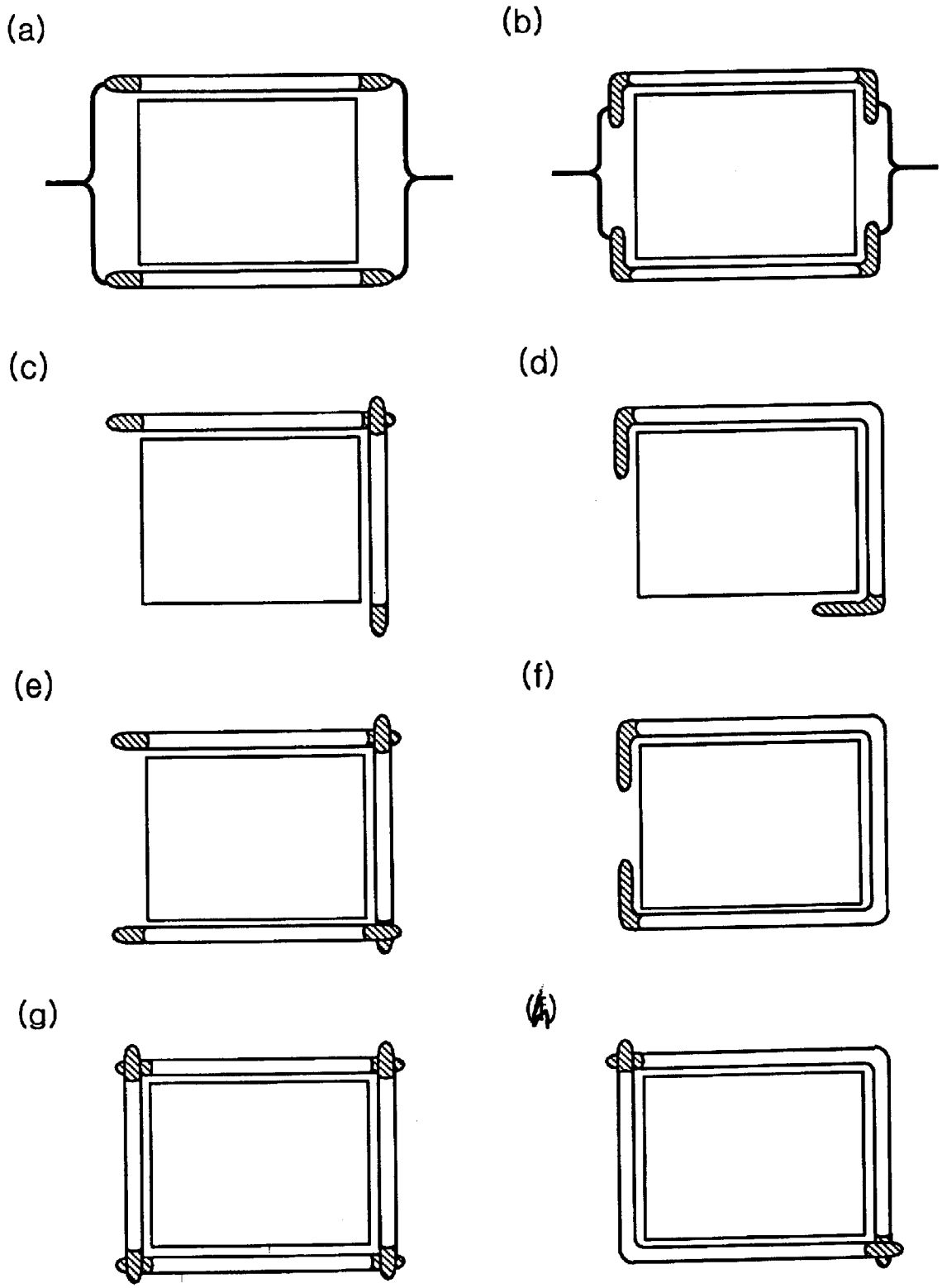
FIGS. 2(a–h) illustrates different arrangements of a backlight source according to the first embodiment of the present invention, wherein the external electrode fluorescent lamps (EEFL) are disposed at the edge areas of a plastic light guide.

FIG. 2 shows different forms of edge backlight sources according to the second embodiment of the present invention. As shown in FIG. 2, the EEFLs may be disposed around the plastic light guide in various formats. The edge active lighting type electrode can be employed as the external electrode fluorescent lamp and the cold cathode fluorescent lamp since high luminance and high efficiency can be realized using the electrode structures, as shown in FIG. 1. To this end, the inventive lamps are disposed at the edge portions of the plastic light guide and driven by a single inverter. The inventive lamps may be installed on both ends or along all edge portions of the plastic light guide.

FIG. 3 shows different direct light arrangements of the EEFLs according to the second embodiment of the present invention. The present invention is characterized in that high luminance and high efficiency are achieved by driving the parallel-connected EEFLs by a means of the switching inverter. The fine tube having an outer diameter of 2.6 mm can obtain high efficiency with the luminance of about 10,000 cd/m$^2$. Therefore, if a backlight source with high luminance of 10,000 cd/m$^2$ or higher is desired, the EEFLs is disposed on a planar reflecting plate, which has smaller spacing between the lamps. However, if backlight source with luminance of several 1,000 cd/m$^2$ is desired, a particular structure of the reflecting plate for improving reflectivity thereof should be employed. Here, all the lamps disposed on the reflecting plate are interconnected in parallel and driven by a single inverter.

Figure 3A:
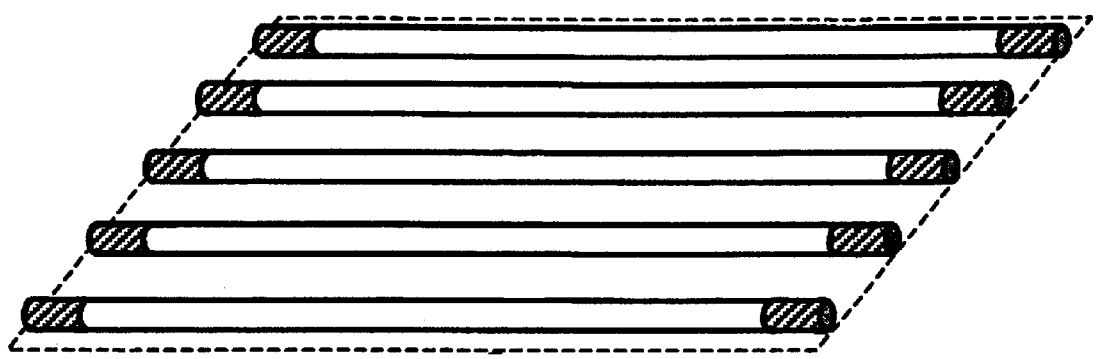
FIG. 3a is an illustrative view showing one arrangement of straight end-cap type fluorescent lamps according to a second embodiment of the present invention.
Figure 3B:
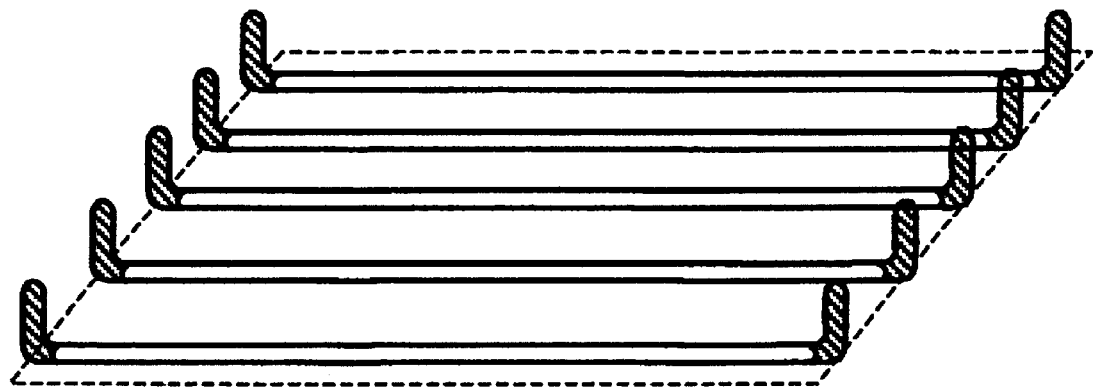
FIG. 3b is an illustrative view showing another arrangement of the curved electrode type fluorescent lamps according to the second embodiment of the present invention.
Figure 3C:
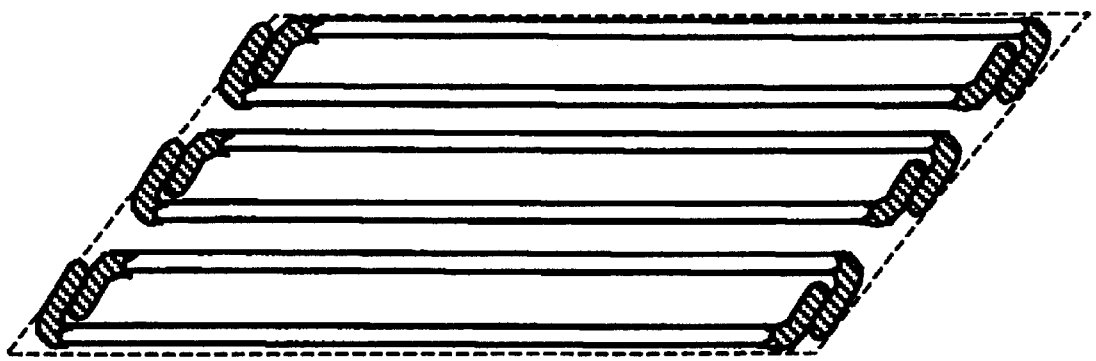
FIG. 3c is an illustrative view showing another arrangement of the curved electrode type fluorescent lamps according to the second embodiment of the present invention.
Figure 3D:
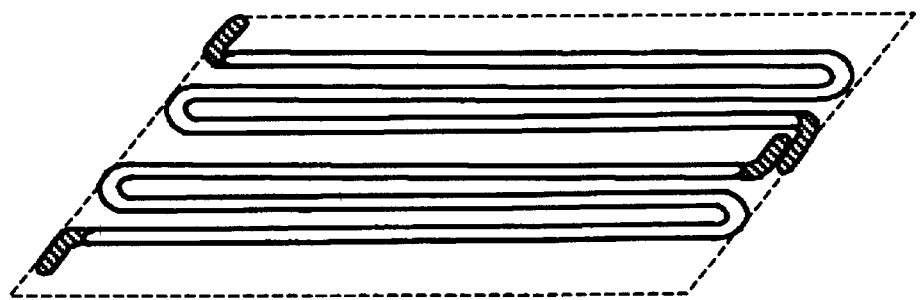
FIG. 3d is an illustrative view showing another arrangement of the elongate fluorescent lamps that is bent at the edge areas according to the second embodiment of the present invention.
Figure 3E:
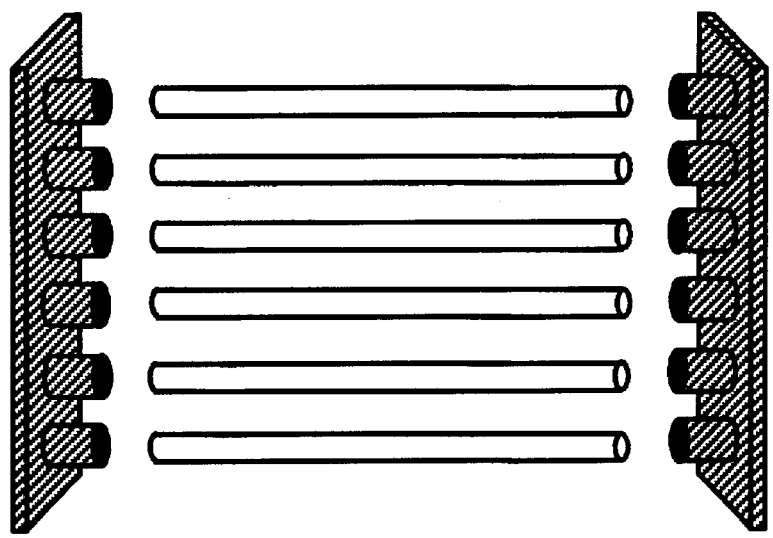
FIG. 3e is an illustrative view showing another arrangement of the elongate fluorescent lamps with overlapped capsule structures according to the second embodiment of the present invention.
Figure 3F:
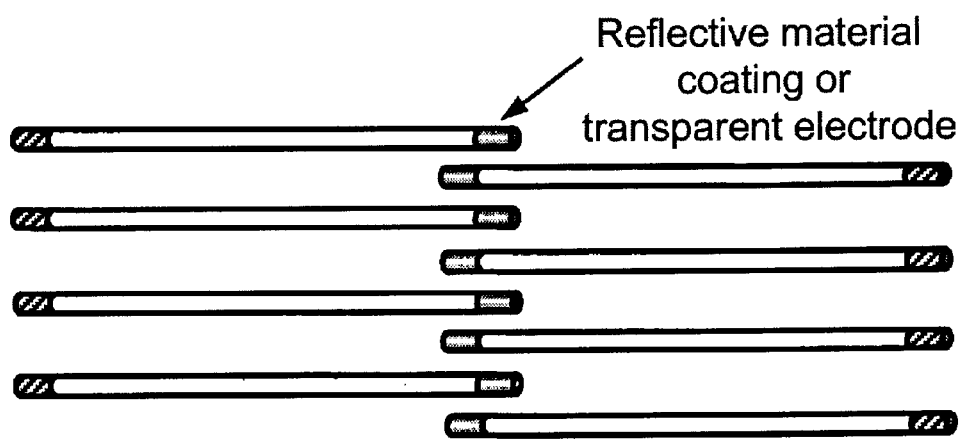
FIG. 3f is an illustrative view showing another arrangement of the elongate fluorescent lamps with a bi-directional overlapped structure for use in a large screen device according to the second embodiment of the present invention.

The area of the electrode portions from which the light is not emitted is defined by disposing the straight EEFLs at an appropriate spacing, as shown in FIG. 3a, or by erecting the "L"-shape electrode as shown in FIG. 3b, or by laying the "L"-shape electrode on the plane as shown in FIG. 3d. In FIG. 3d, in order to enhance active lighting efficiency of the lamps, the elongate lamps are disposed in a manner so that they are bent at the edge portions of the panel. Another lamp can be formed by inserting electrodeless lamps into socket-type multiple capsule electrode structures, as shown in FIG. 3e. Finally, FIG. 3f shows an arrangement of the EEFLs for manufacturing an extra-large backlight. In this case, a plurality of the EEFLs are disposed in a longitudinal direction of the lamp, and the reflective material is applied on the electrode face or the electrode itself that is made of transparent electrode material, in order to avoid a sudden decrease of the luminance at the electrode portions. To compensate for a luminance decrease at the overlapped portions of the lamps, the electrode portions are alternately disposed and transversely overlapped with each other at the intermediate portion of the panel, as shown in FIG. 3f. Here, luminance decrease is minimized by coating an additional reflective material onto the electrode surface, which is located at the intermediate portion of the panel, or by forming the middle electrode with a transparent electrode material.

Figure 4:
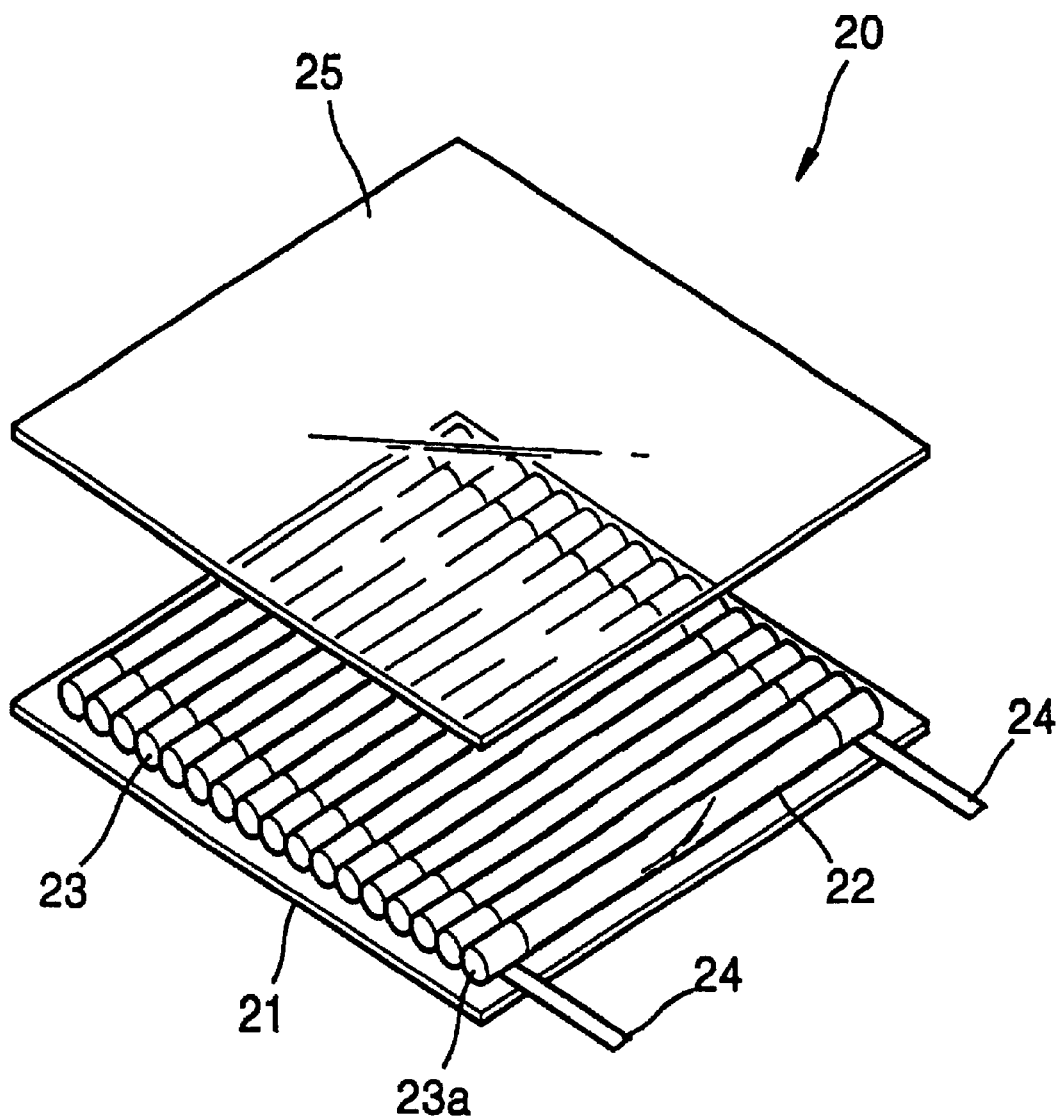
FIG. 4 is an exploded perspective view of a direct light type backlight source according to the second embodiment of the present invention.
Figure 5A:
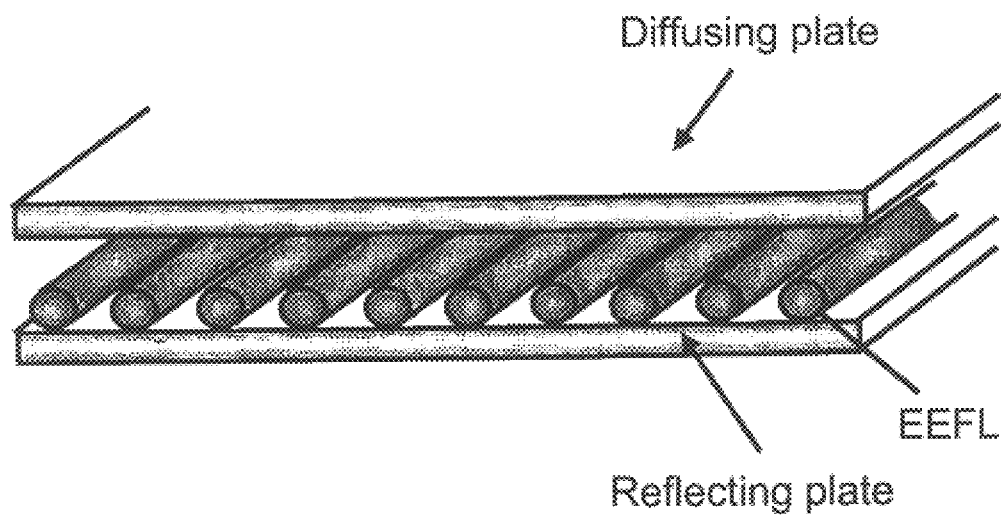
FIGS. 5a–5d show different arrangements of a reflecting plate and fluorescent lamps according to the second embodiment of the present invention.
Figure 5B:
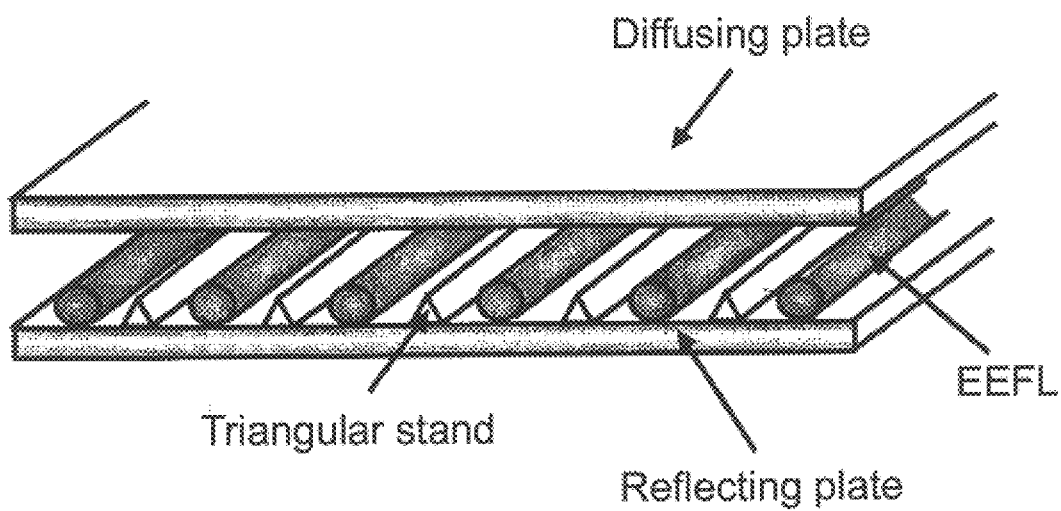
Figure 5C:
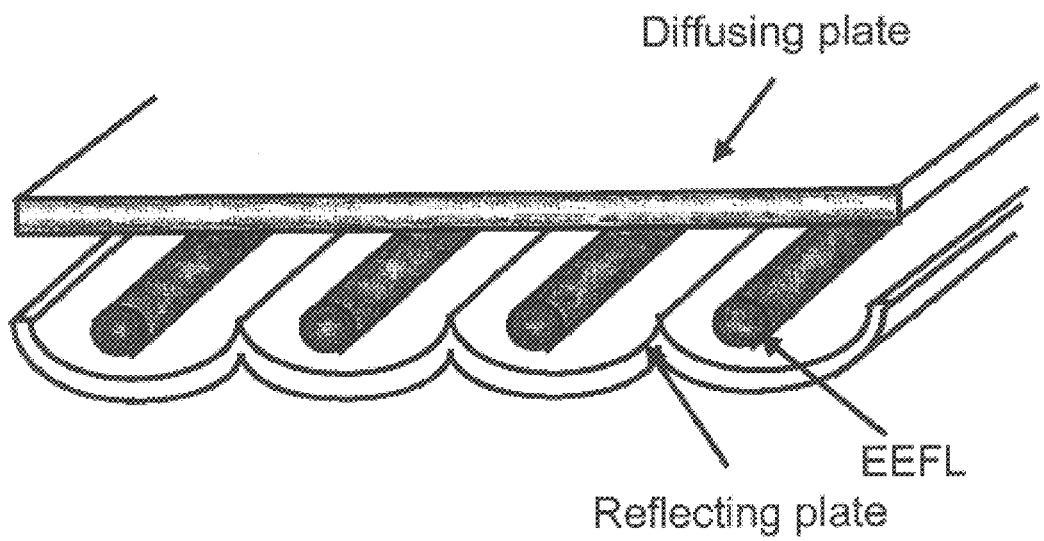
Figure 5D:
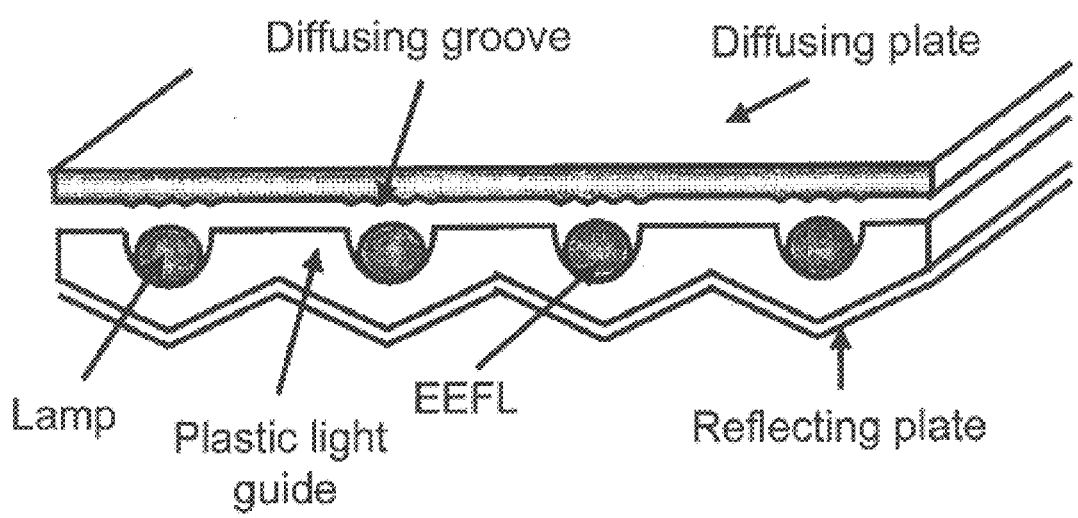

FIG. 4 shows a backlight source in which a direct light-type EEFL according to a second embodiment of the present invention is arranged. Referring to FIG. 4, the reflecting plate 21 is provided as a backlight source 20. A plurality of fluorescent lamps 22 is installed in parallel on the upper surface of the reflecting plate 21. As described above, the fluorescent lamps 22 are external electrode fluorescent lamps (EEFLs) in which the fluorescent substance is applied to the inner peripheral surfaces of the lamps and the external electrodes 23 that are made of electrically conductive material, are respectively formed at both ends of the outer peripheral surfaces of the lamps. In order to maintain an uniform luminance, a plurality of the fluorescent lamps 22 are disposed at a constant interval on the upper surface of the reflecting plate 21, and they are closely in contact with one another.

Furthermore, in order to electrically connect the fluorescent lamps 22, the current can flow among the external electrodes 23 of the fluorescent lamps 22, and an electrode connecting line 24 is connected to each of the outermost external electrodes 23a. This causes all of the fluorescent lamps 22 to be driven in parallel when an alternating current type power source is applied thereto.

A diffusing plate 25 is installed above the fluorescent lamps 22 in opposite end of the reflecting plate 21. It is preferred to maintain the diffusing plate 25 is spaced away from the fluorescent lamps 22 to prevent the image of the fluorescent lamps 22 from being formed thereon, thus improving the uniformity of luminance. Here, the spacing between the diffusing plate 25 and the fluorescent lamps 22 corresponds to the diameter of the fluorescent lamps 22. For example, if the diameter of the fluorescent lamps 22 is 2.6 mm, the spacing between the diffusing plate 25 and the fluorescent lamps 22 is also 2.6 mm. As a result, a minimum thickness of 5.2 mm is obtained.

The experiment of the applicant shows that the backlight 30 with the EEFL having an outer diameter of 2.6 mm had the luminance of 10,000 cd/m$^2$ or more and an efficiency of 50 lm/W or more, and does not create undesirable high heat from the backlight. In particular, as the length of the elongate EEFL is increased, the luminance and efficiency was also increased.

FIG. 5 shows the arrangement of the EEFL relative to the reflecting plate according to the second embodiment of the present invention. In FIG. 5a, the EEFLs are disposed on a planar reflecting plate, and the spacing between adjacent lamps corresponds to the diameter of the lamp. In this case, the backlight is configured to have a luminance greater than that of a single lamp of FIG. 4. However, in FIGS. 5b to 5d, the backlight is configured to have a luminance of the panel that is less than that of a single lamp, and the spacing between adjacent lamps corresponds to several times larger than the diameter of the lamp. In the later cases, triangular stands are installed onto the reflecting plate in order to enhance the reflectivity, as shown in FIG. 5b. In addition, a concave mirror type reflecting plate can be installed as shown in FIG. 5c, or the lamps inserted into grooves can be installed as shown in FIG. 5d. According to the experimentation by the present applicant, the backlight having high efficiency of 50 lm/W or more with the luminance of 1,000 cd/m$^2$ or more was realized when the EEFLs with an outer diameter of 2.6 mm are disposed onto the reflecting plate at the interval of about 15 mm and the distance between the lamp and the diffusing plate being set to 25 mm.

Figure 6A:
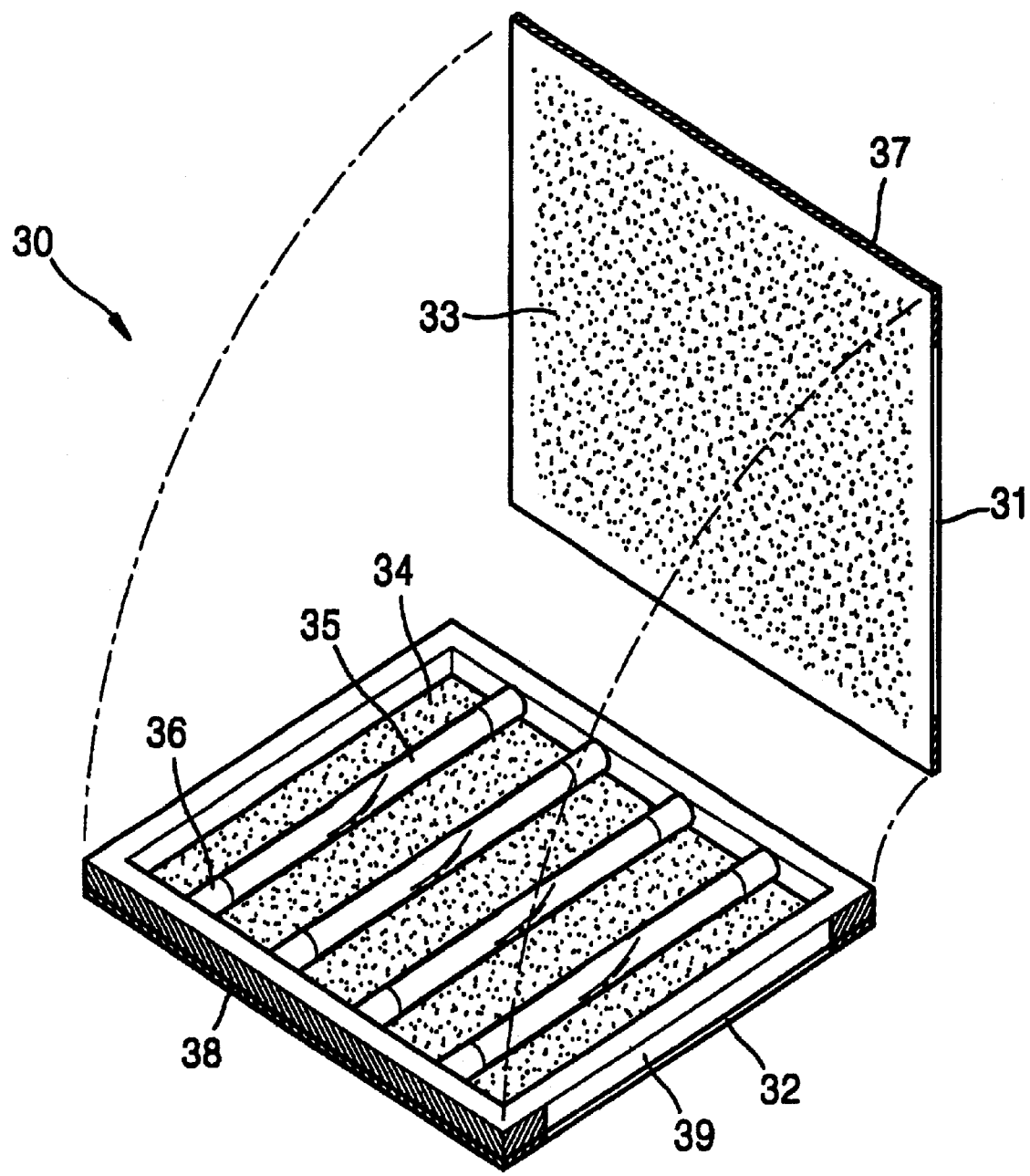
FIG. 6a is an exploded perspective view of a luminant partition type backlight according to a third embodiment of the present invention prior to being assembled.
Figure 6B:
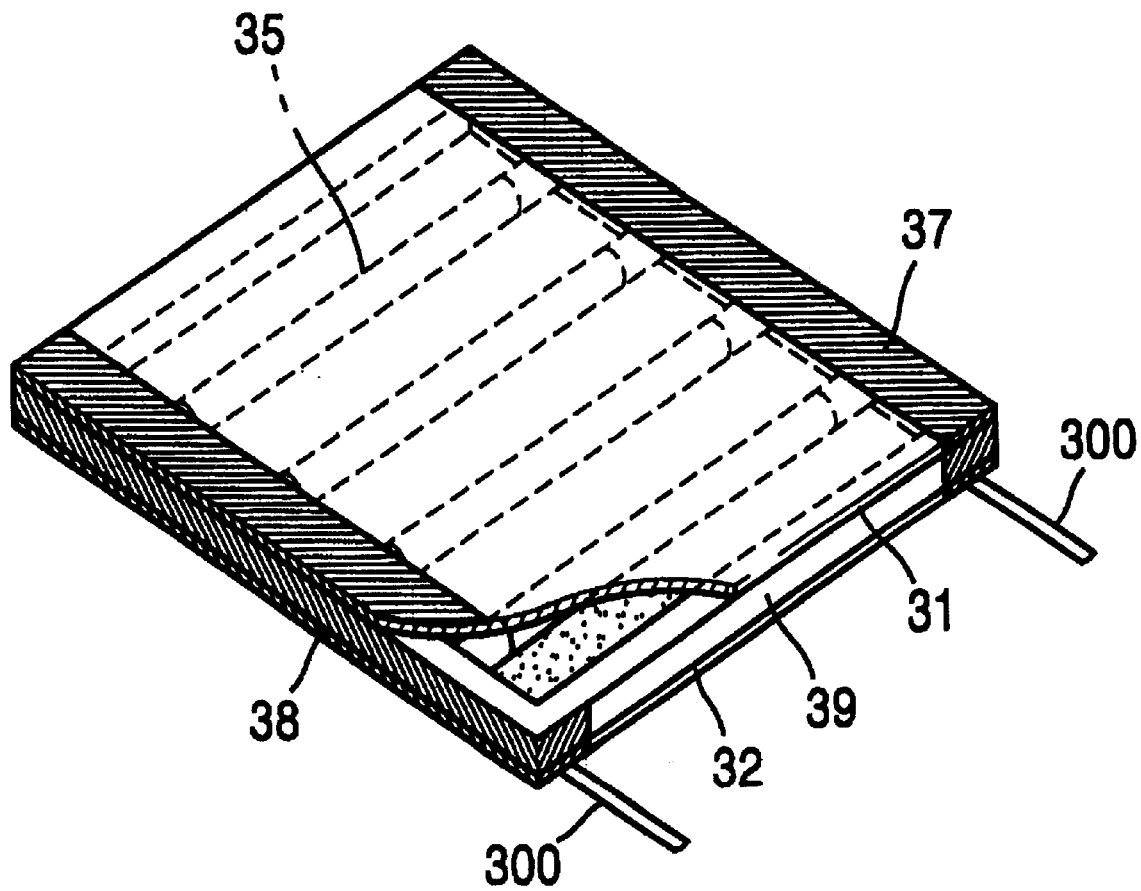
FIG. 6b is a partially cut-away and exploded perspective view showing a state after the backlight of FIG. 6a is assembled.

FIG. 6a shows a third embodiment of the backlight 30 according to the present invention, and FIG. 6b shows the assembled state of the backlight 30 shown in FIG. 6a. Referring to FIGS. 6a and 6b, the backlight 30 includes an upper substrate 31 and a lower substrate 32 distanced a part by a predetermined amount. The bottom surface of the upper substrate 31 is formed of an upper layer 33 of fluorescent substance. The top surface of the lower substrate 32 is also formed with a lower layer 34 of fluorescent substance.

A plurality of fluorescent lamps 35 is installed at a predetermined interval above the lower substrate 32. The fluorescent lamps 35 serve to support the upper and lower substrates 31 and 32 when coupled, and simultaneously, serve as a partition therebetween. The external electrodes 36 made of electrically conductive material are installed at both ends of the outer peripheral surface of each fluorescent lamp 35.

In order to supply the backlight 30 with electrical power, an upper electrode 37 and a lower electrode 38 are installed along the outer surfaces of the corresponding sides of the assembled upper and lower substrates 31 and 32, respectively. Each of the upper and lower electrodes 37 and 38 is made of an electrically conductive material and covers the outer surface of the upper and lower substrates 31 and 32, respectively. It is preferably to dispose the lower electrode 38 on the bottom surface of the lower substrate 32 as large as possible.

Edge supporting stands 39 are installed between the upper and lower substrates 31 and 32 for hermetically sealing them and maintaining air-tightness along the edges of the upper and lower substrates 31 and 32. A discharging gas is injected into the backlight 30 before sealing with the edge supporting stands 39 interposed between the upper and lower substrates 31 and 32. The upper and lower electrodes 37 and 38 may be separately formed on the substrates 31 and 32, respectively, so that the current can flow on both sides of the substrates 31 and 32. Alternatively, the upper and lower electrodes 37 and 38 may be provided in the form of an integral cover after the substrates 31 and 32 are assembled. The upper and lower electrodes 37 and 38 are supplied with electrical power via electrode connecting lines 300 connected thereto at both sides of the substrates 31 and 32.

The external electrodes 36 formed at the end of the fluorescent lamps 35 are not connected directly to the upper and lower electrodes 37 and 38 but disposed in a floating state, so that they produce an electric discharge in a manner induced by electrical power that is supplied to the electrodes 37 and 38. Although the external electrode 36 may be excluded, the installation of the external electrode 36 is advantageous to the obtainment of a stable electric discharge. When the backlight 30 constructed as shown in FIG. 6 is supplied with electric power through the electrode connecting lines 300, the external electrode fluorescent lamps 35 disposed between the upper and lower substrates 31 and 32 function as the partition and also emit light.

Figure 6C:
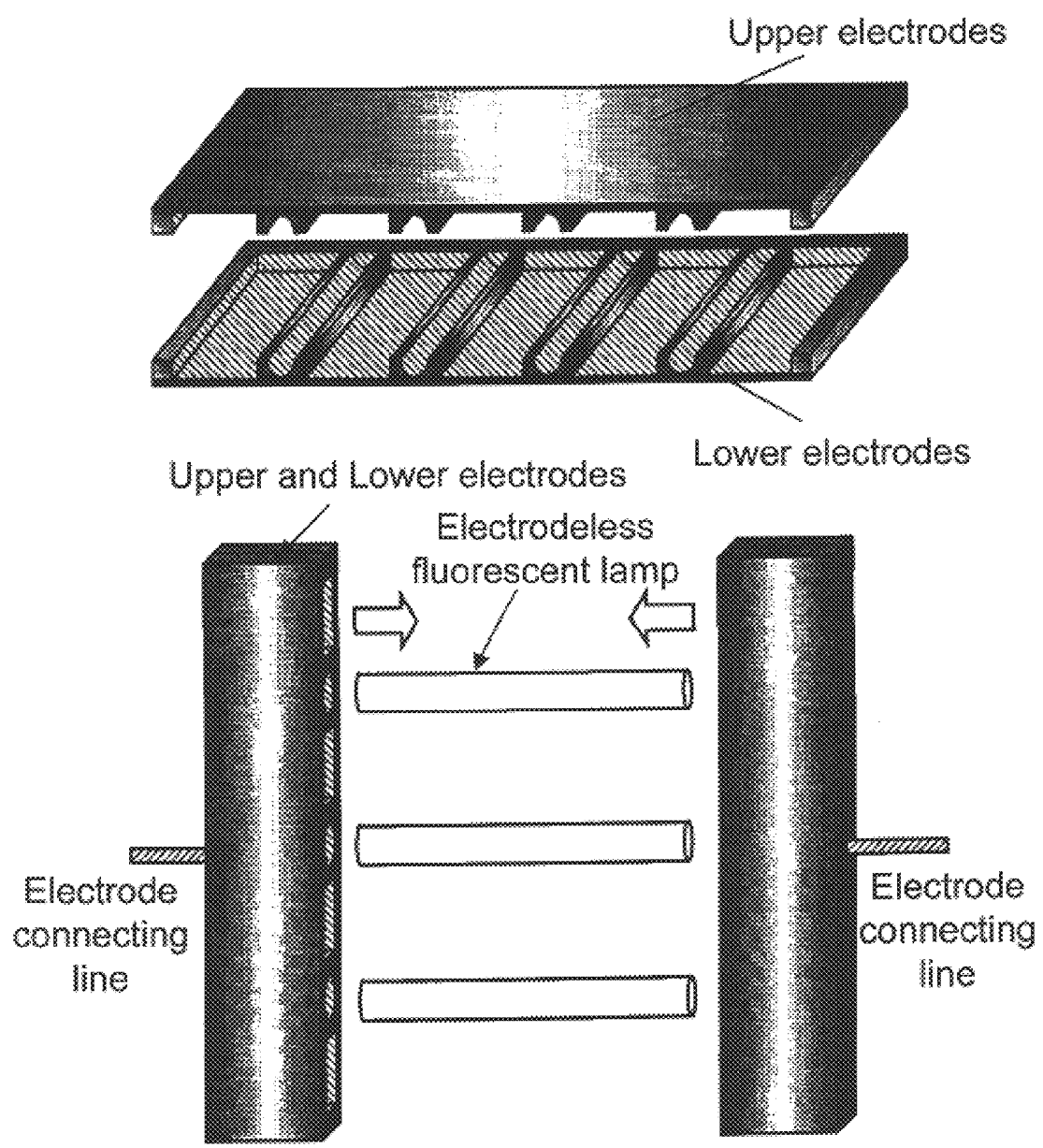
FIG. 6c is a view for illustrating the electrodeless fluorescent lamps and multiple capsule electrodes that are disposed within the substrates of the ruminant partition type backlight according to the third embodiment of the present invention.

The flat panel lamp of FIGS. 6a and 6b has an advantage in that the voltage can be applied to the planar external electrode, but has a disadvantage in that high driving voltage has to be applied because of an electric capacitive voltage drop due to the thickness of upper and lower glass substrates. In order to improve the foregoing, an electrode that is made of metal coated with dielectric substance can be installed on the inside of the planar plate. That is, multi-capsule electrode structures for mounting the electrodeless fluorescent lamp installed on the inner portion at both ends of the lower substrate, as shown in FIG. 6c, can be arranged. Here, the lamps can be connected to the electrical power via the electrode connecting lines that are coupled to the outside. Direct current cannot flow directly into the electrode since ferrodielectrics are applied onto the entire surface of the multi-capsule electrode structure. As shown in FIG. 6c, upper and lower parts (upper and lower electrodes) are separately manufactured so as to easily apply the ferrodielectrics on the inside of the grooves, and the ferrodielectrics are applied onto the entire surface of the grooves. Then, the electrodeless fluorescent lamps are mounted into the grooves and the upper and lower electrodes are combined.

Therefore, the conventional backlight cannot maintain uniform luminance because a portion where the fluorescent lamps are installed is darkened due to the installation of the fluorescent lamps if the fluorescent lamps are used as a partition. Hence, a uniform luminance can be obtained because the fluorescent lamps 35 can emit light by themselves. In addition, since the fluorescent lamps 35 also serve as a partition, the glass thickness of the upper and lower substrates 31 and 32 are reduced and the device as a whole becomes lighter.

Now, an inverter according to an embodiment of the present invention for driving the backlight with the edge light type and direct light type EEFLs will be explained in detail.

The switching inverter according to an exemplary embodiment of the present invention includes a combination of a switching circuit and a boosting transformer. The power source outputs square waves suitable for driving a plurality of external electrode fluorescent lamps interconnected in parallel; thus, it can easily adjust the condition of a frequency and the outputted waveform and has overshooting portions in the outputted waveform.

The split drive according to another embodiment of the present invention is applied to a large backlight due to the planar arrangement of the EEFLs, or to a large flat panel lamp in which the electrodes are coated with dielectric layers and an alternating-current type discharge is employed. With the split drive type, the large area is divided into some regions, which in turn are driven by waveforms having identical phases, thereby reducing the size of the driving apparatus and allowing stable and high-speed driving.

Figure 7:
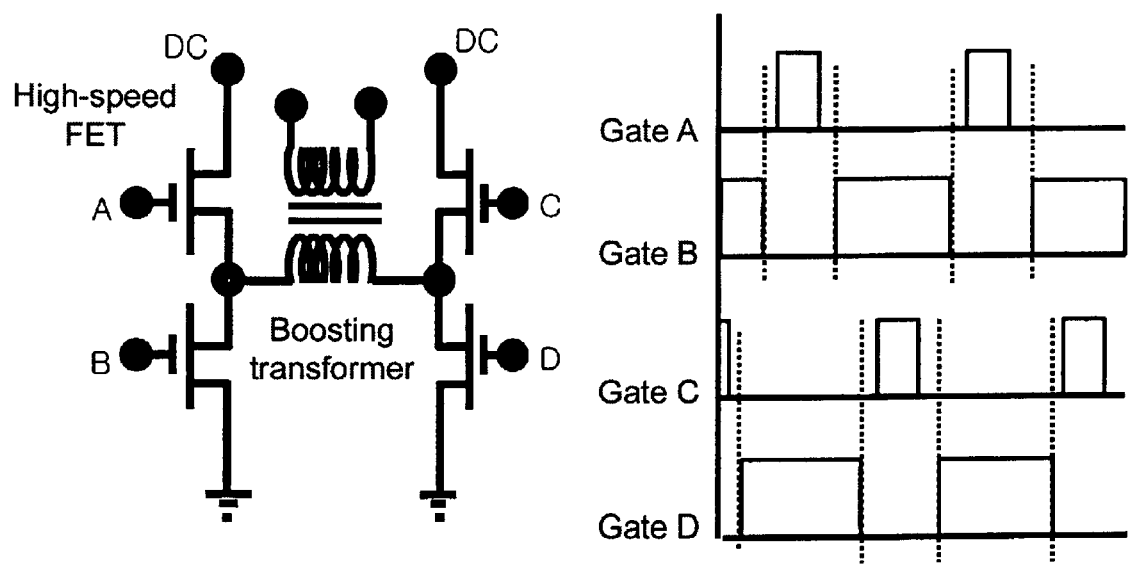
FIG. 7 is a schematic diagram showing a switching inverter according to an embodiment of the present invention and the signal waveforms applied to the gates of the inverter.

FIG. 7 shows signal waveforms to be applied to the switching inverter and gates according to an exemplary embodiment of the present invention. This apparatus is designed for effectively driving a plurality of EEFLs interconnected in parallel. The circuit of the apparatus is characterized in that unlike the LC-resonance type inverter used for driving the conventional CCFL, it outputs high-voltage square waves by the combination of a boosting transformer and four high-speed FETs serving as switches. Furthermore, a frequency of the outputted square waves, a voltage maintaining ratio and the like, are easily controlled by adjusting each of FET gate signals as shown in FIG. 7.

Figure 8:
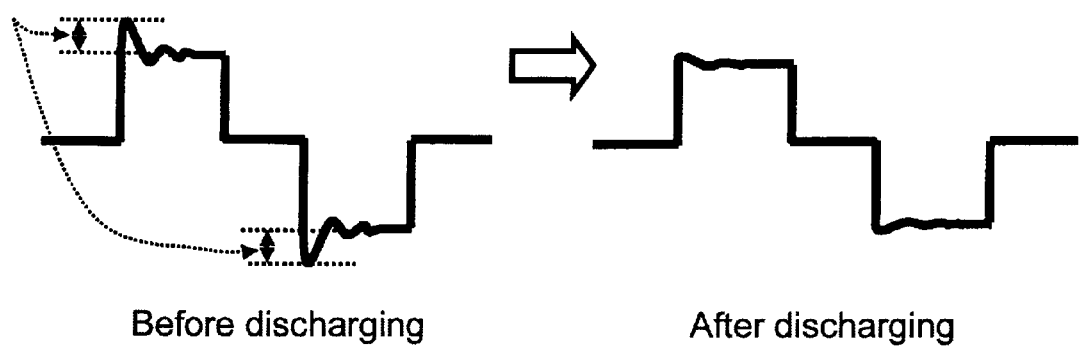
FIG. 8 is a schematic diagram showing the change of an output signal waveform of a switching inverter according to an embodiment of the present invention before and after discharge is initiated.

The operating principle of the switching inverter according to the present invention is as follows. In the state where DC is applied to the FET installed at the top end of the circuit and to the drains of the gates A and C, the gate signals having the shapes shown in FIG. 7 are applied to the respective FETs. Then, in the respective FETs, the gates A and D are simultaneously turned on and then turned off, with the gates C and B also operating in the same manner. At this time, since the boosting transformer is connected to output the terminals of the left and right FETs, the electric current flows alternately into the primary coil of the boosting transformer while the respective FETs are turned on. Therefore, the high-voltage square waves shown in FIG. 8 are outputted from a secondary coil of the boosting transformer. This outputted waveforms are characterized in that unlike the sine wave, the voltage rising time is short and has constant voltage maintaining regions. In addition, due to the characteristics of the coil, a transient overshooting voltage is produced in the region where the voltage suddenly varies.

The outputted voltage waveform in the form of square wave produced from the switching inverter can stably operate the plurality of EEFLs interconnected in parallel to obtain uniform luminance using only one switching inverter, compared to the conventional LC-resonance type inverter. This is because the square wave has a constant voltage maintaining region unlike the sine wave. Hence, in the case where the respective EEFLs are turned on by simultaneously applying the square waves thereto, even if the respective EEFLs are sequentially turned on within one period of the applied voltage, the lighting of respective lamps becomes uniform and maintains constant luminescence uniformity. This is also because the voltage rising time of the square wave is shorter than that of a sine wave with the same frequency of the square wave. Many space charges and excited molecules remain in the tubes of the lamps after the lamps are sequentially turned on and off by the initially applied voltage, and the space charges among them are gradually recombined with the wall charges by an electric field formed between the space and wall charges formed around the electrodes in the initial discharge. The movement of such space charges and excited molecules depend on the intensity and the change with time of the electric field acting on the tube. Since the voltage rising gradient of the sine wave is always smaller than that of the square wave with the same frequency of the sine wave, the voltage is applied for a relatively long time before starting a second discharge. During that period of time, a kind of wall charge eliminating phenomenon, in which the space charges are recombined with the wall charges formed in the initial discharge by the electric field that is formed by the applied voltage, occurs.

Thus, the amount of wall charges is lowered, which results in a reduction of the voltage region that is capable of maintaining the stable discharge, i.e., the maintaining voltage margin. Thus, the intensity of discharge is also lowered, so that the luminance and the efficiency are lowered.

However, the square wave outputted from the switching inverter according to the present invention has a voltage rising time relatively shorter than that of the sine wave and allows the applied voltage to exceed a discharge starting voltage and to start discharging before the space charges are recombined with the wall charges. Therefore, since the wall charge eliminating phenomenon mentioned above becomes insignificant, the maintaining voltage margin becomes relatively larger than that of the sine wave to allow of a stable operation. Moreover, the effect of the steep rising gradient of voltage allows an instantaneous and faster movement of the space charges, so that the effective collision of the space charges with the neutral and excited molecules increases, thereby imparting additional effects that secondary electrons are actively produced to make the discharge stronger and maintaining voltage margin large.

Figure 9:
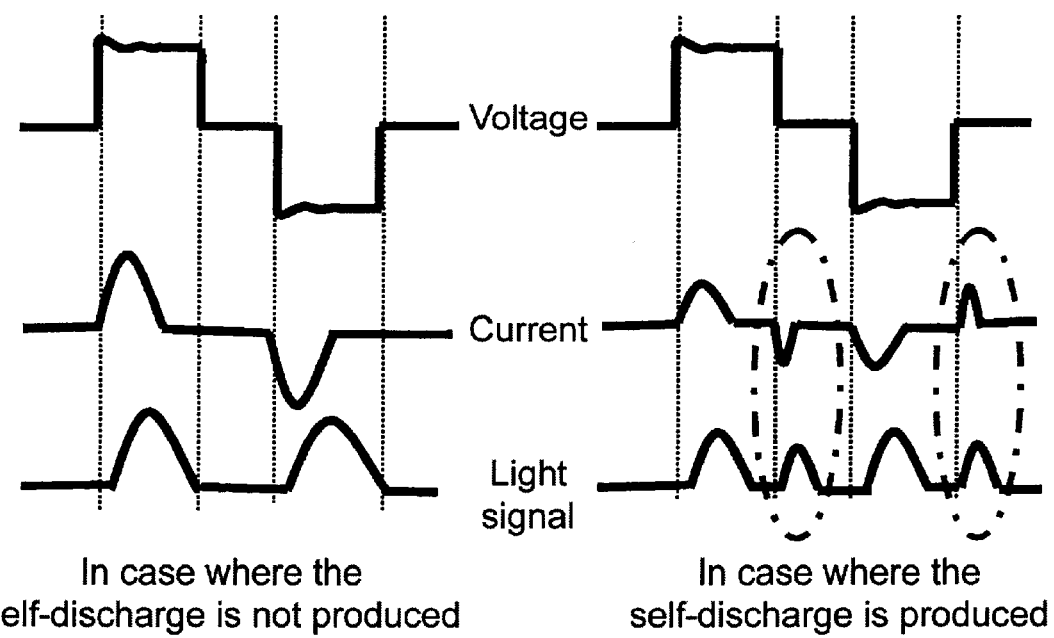
FIG. 9 is a schematic diagram showing the self-discharge phenomenon of a square wave driving according to an embodiment of the present invention.

The overshooting voltage produced in the rising or lowering portion of the outputted waveform of the switching inverter shown in FIG. 9 facilitates the starting of discharge and permits separate adjustment of the output voltage after the starting of discharge is eliminated. The magnitude of the overshooting voltage depends on the output transformer and the electrical capacity of the EEFL. The inventor found from an experiment that the magnitude of the overshooting voltage has a value of about 20% to 30% before the starting of discharge, and is reduced to a value less than 3% while the discharge is maintained after the starting thereof. That is, the effect of the overshooting voltage occurs only before the starting of discharge. The EEFL has the above characteristic since the EEFL has a net capacitive load before the starting of discharge, and has both capacitive and resistive loads after the starting of discharge to produce oscillating attenuation effects by the resistive component of load. As a result, this means that the overshooting voltage has an effect only before the starting of discharge, which facilitates the starting of discharge.

Generally, whether a discharge tube is an AC type or a DC type, the voltage before the starting of discharge is higher than the discharge maintaining voltage. If there is an overshooting voltage in the outputted waveform, an applied voltage for starting to discharge may be reduced by that portion. For example, if the discharge starting voltage of a certain discharge tube is 1.3 kV and the overshooting portion of a voltage waveform to be applied thereto is 30%, the discharge can start only with a mean output voltage of 1 kV. In particular, the longer the length of EEFL, the discharge starting voltage is higher.

A waveform having an overshooting portion is advantageous when an elongated tube is used. Another important effect is to be able to eliminate a voltage adjusting process generally performed after the starting of discharge. In practice, when a waveform with no overshooting portion is used, a method is employed for artificially lowering voltage on the grounds of the lifetime of the discharge tube, the luminance adjustment and the like after the starting of discharge by the application of a voltage required to start on the discharge. Since the switching inverter has a difference of about 20% to 30% in values of peak voltage between before and after the starting of discharge due to the presence of the overshooting voltage, the voltage is automatically adjusted to the level of the maintaining voltage after the starting of discharge, so that it is not necessary to attach a separate voltage adjusting device.

Furthermore, the efficiency and luminance according to present invention can be improved through a self-discharge effect. The self-discharge is a phenomenon found only in an AC discharge tube, in which when a voltage applied from the outside is lowered and reaches zero potential. In a case where the intensity of the wall voltage induced by the wall charges formed by the discharge is larger than the discharge starting voltage, a discharge occurs among the wall charges.

FIG. 8 shows the square waves generated from the switching inverter and the self-discharge phenomenon that is produced when the square waves are applied to the EEFL. In case where the self-discharge is produced, the discharge current and the number of luminescence per period of the voltage waveform are twice as many as those when it is not produced, but the intensity thereof is relatively smaller than that when the self-discharge is not produced. This is because some of the wall charges are eliminated due to production of the self-discharge. If such self-discharge is produced, the efficiency and the luminance are enhanced.

Figure 10:
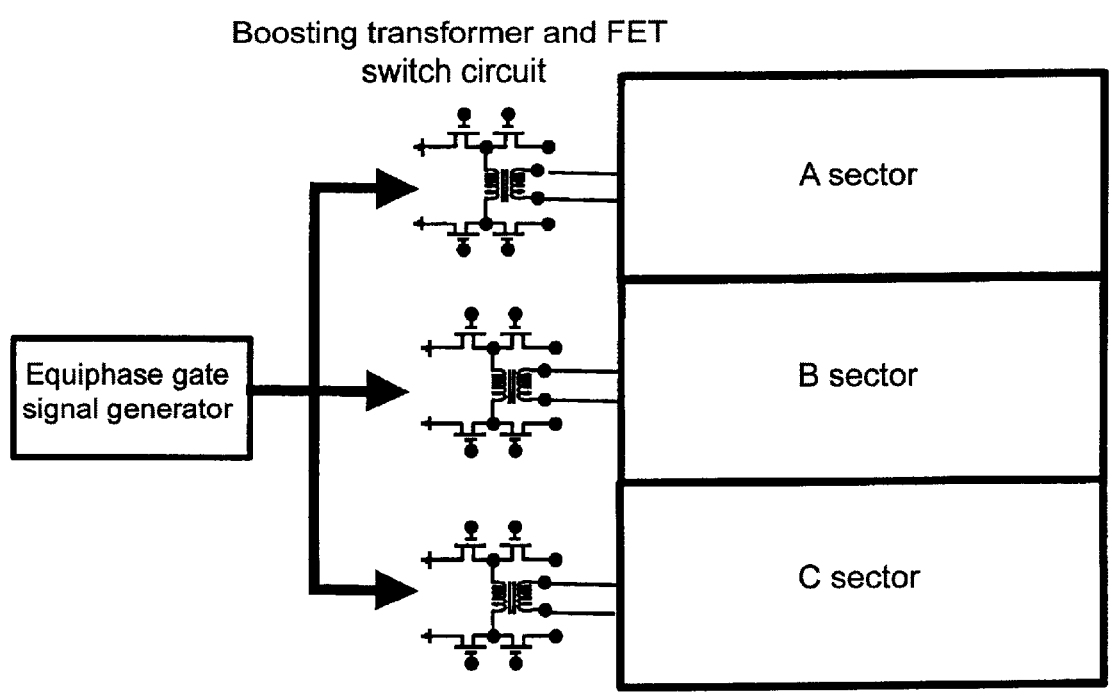
FIG. 10 is a diagram showing an in-phase split driving circuit for a large backlight according to another embodiment of the present invention.
Figure 11:
FIG. 11 shows illustrative views of conventional external electrode fluorescent lamps; and, FIG. 12 is a circuit diagram showing the CCFL driving IC for a conventional LCD panel and its related peripheral circuitry.
Figure 11:
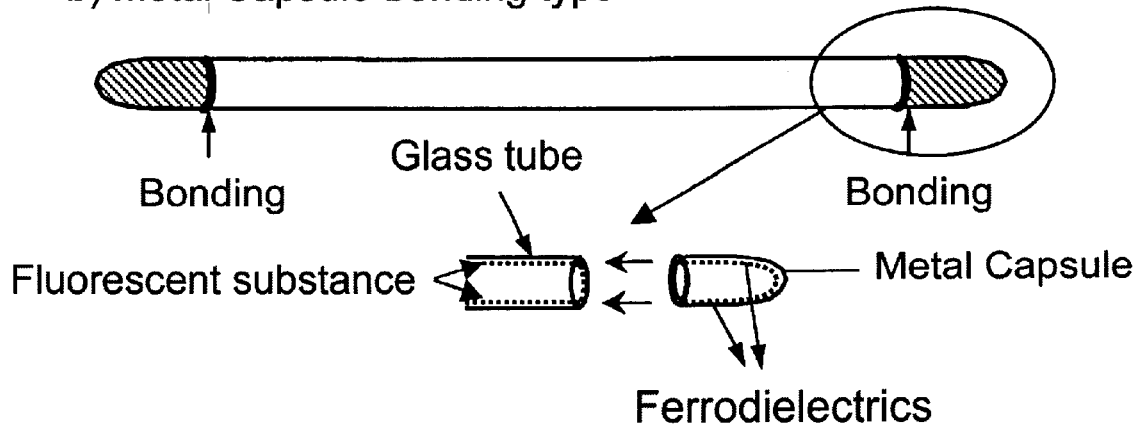
Figure 11:
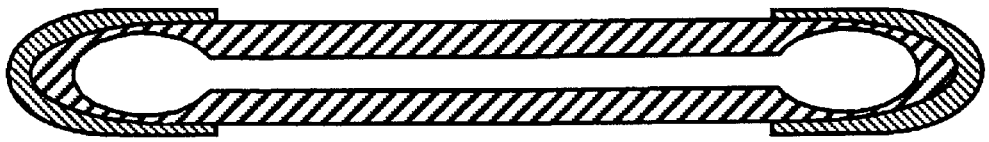
Figure 11:
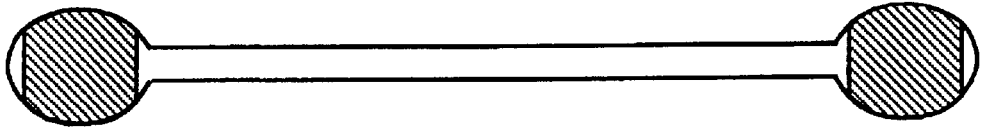
Figure 12:
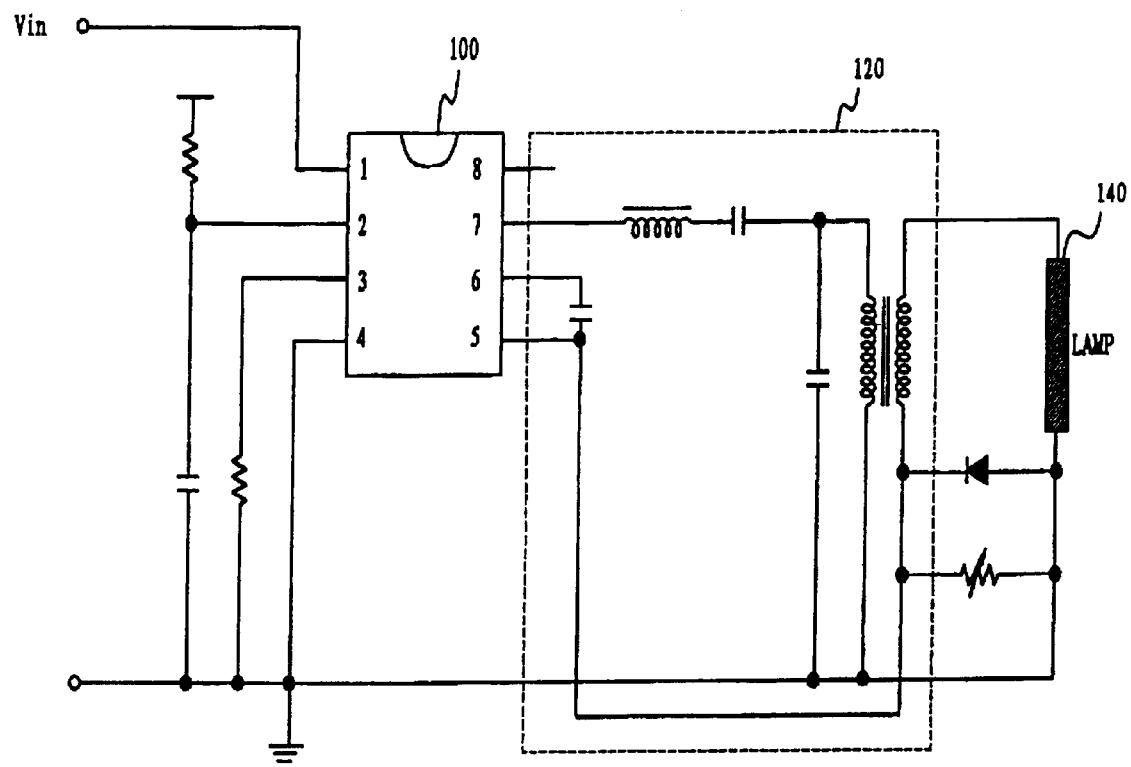

According to a further embodiment of the present invention, a split drive type of large backlight is provided. A small backlight that is constructed by disposing EEFLs on a plane can be driven by a single switching inverter. However, since electric power to be consumed becomes large as the area becomes large, the size of a boosting transformer used for the inverter is larger. Thus, it is difficult to manufacture a small switching inverter. In addition, if the length of a line for applying a voltage is increased, problems such as signal interference, impedance matching, etc. are generated, thereby causing the luminance not to be uniform. These problems are solved in the present invention by employing a split drive manner in which the entire backlight is divided into regions having appropriate sizes, and the divided regions are driven by switching inverters for outputting consistently voltage waveforms having the same phase, as shown in FIG. 10. Here, the reason why the outputted waveform of each switching inverter must have the same phase is that a leakage of electricity can occur at adjacent portions between the divided regions if the phases are different from each other. The method to have the outputted waveform of each switching inverter includes the same phase is to independently connect a FET for performing high speed switching of the switching inverter at each region with a boosting transformer and to share a gate signal for the FETs. At this time, since the circuit for generating gate signals is shared, the cost is saved in comparison with the case where a plurality of switching inverters is used. Furthermore, the size of the boosting transformer can be reduced to a compact size.

In summary, since the electrodes of the fluorescent lamps are formed at the outside, it is easier to manufacture the fluorescent lamps. By employing the straight end-cap by of bending both ends of the glass tube to make the length of both electrodes of the glass tube to be sufficient, high luminance and high efficiency are realized. The fluorescent lamps being disposed at the edges of the plastic light guide or repeatedly disposed in a plane, the fluorescent lamps are connected to one power source in parallel and can be driven by a power source so that a thin backlight having high luminance and high efficiency can be easily manufactured.

Second, since the fluorescent lamps serve as a partition and simultaneously emit light by themselves, uniform luminance can be maintained. By employing the fluorescent lamps as the partition, a thin upper and lower substrates can be employed. Thus, a surface light source having a large area, which ensures uniform luminance, can be manufactured.

Third, since the backlight constructed by disposing the plurality of external electrode fluorescent lamps is driven by a low frequency of several dozen kHz, the problem of EMI can be avoided.

Fourth, since the switching inverter, with the high speed FET coupled to the boosting transformer outputs high voltage square waves and produces an overshooting voltage, a uniform luminance can be obtained at high speed; the discharge starting voltage can be naturally lowered; and, the self-discharge effect can be obtained. With such effects, high luminance and high efficiency are obtained.

Fifth, according to the switching inverter of the present invention constructed by sharing a gate signal of the FET element and independently connecting only the boosting transformers to divide and drive the display screen with a large backlight source, the voltage having the same phase is applied to each of the divided display screens so that leakage of electricity between adjacent divided regions is prevented to make the discharge stable. Hence, a uniform luminance is obtained in the large backlight. In addition, since the length of line to which the voltage is applied can be reduced and the problems of signal interference and impedance matching can be avoided, a uniform luminance is obtained. Moreover, since the size of the boosting transformer can be reduced and the gate signal generator is shared, a compact switching inverter is obtained.

Furthermore, according to the switching inverter of the present invention, i) a plurality of EEFLs interconnected in parallel can be driven at high speed using a single switching inverter to make luminance uniform, ii) the discharge starting voltage can be reduced due to the presence of an overshooting voltage, and iii) the luminance and the efficiency thereof can be enhanced due to the presence of self-discharge.

Although the present invention has been described with reference to the preferred embodiment as shown in the drawings, it should be understood that the embodiment is merely illustrative and those skilled in the art will make various modifications and its equivalents from the embodiment. Therefore, the true scope of the present invention must be defined by the claims attached hereto.

What is claimed is:

1. A backlight, comprising:

a plastic light guide;

a plurality of fluorescent lamps disposed at edges of said plastic light guide, each of said fluorescent lamps including a glass tube into which a discharge gas is injected, wherein the inner peripheral wall of said glass tube is coated with a layer of fluorescent substance, wherein both ends of said glass tube are hermetically sealed;

end-cap type external electrodes for covering said both ends of said glass tube; and, a switching inverter connected to said external electrodes for applying square wave signals having a frequency of 100 kHz or lower to said external electrodes.

2. The backlight of claim 1, wherein said external electrode fluorescent lamps include a plurality of external electrode fluorescent lamps interconnected in parallel.

3. The backlight of claim 1, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

4. The backlight of claim 1, wherein a square wave outputted from said switching inverter includes an overshooting.

5. A backlight, comprising:

a plurality of external electrode fluorescent lamps interconnected in parallel, each of said fluorescent lamps including a glass tube into which a discharge gas is injected, wherein the inner peripheral wall of said glass tube is coated with a layer of fluorescent substance, and both ends of said glass tube are hermetically sealed;

end-cap type external electrodes for wrapping said both ends of said glass tube;

electrode connecting lines for connecting said end-cap type external electrodes of said plurality of external electrode fluorescent lamps in parallel;

a reflecting plate;

a diffusing plate; and, a switching inverter connected to said electrode connecting lines for applying a square wave signal having a frequency of 100 kHz or lower to said electrode connecting lines.

6. The backlight of claim 5, wherein said reflecting plate further includes a plurality of triangular stands interposed between said external electrode fluorescent lamps.

7. The backlight of claim 5, wherein said reflecting plate is in the form of wave for wrapping said external electrode fluorescent lamps.

8. The backlight of claim 5, further including a plastic light guide having diffusing grooves in which said external electrode fluorescent lamps are seated, wherein said reflecting plate is in the form of triangular sawteeth and said external electrode fluorescent lamps are disposed along troughs of said triangular sawteeth.

9. The backlight of claim 5, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

10. The backlight of claim 5, wherein a square wave outputted from said switching inverter includes an overshooting.

11. A backlight, comprising:

a plurality of glass tubes into which a discharge gas is injected, wherein the inner peripheral walls of said glass tubes are coated with a layer of fluorescent substance both ends of said glass tubes are hermetically sealed;

a pair of socket-type multiple capsule electrode structures for receiving a plurality of parallel-connected external electrodes;

a reflecting plate;

a diffusing plate; and, a switching inverter connected to said socket-type multiple capsule electrode structures for applying square wave signals having a frequency of 100 kHz or lower to said socket-type multiple capsule electrode structures.

12. The backlight of claim 11, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

13. The backlight of claim 11, wherein a square wave outputted from said switching inverter includes an overshooting.

14. A backlight, comprising:
- a plurality of external electrode fluorescent lamps having external electrode portions thereof being alternately disposed and transversely overlapped with each other in the middle of a panel, each of said fluorescent lamps including a glass tube into which a discharge gas is injected, wherein the inner peripheral wall of said glass tube is coated with a layer of fluorescent substance, and both ends of said glass tube are hermetically sealed;
- cap type external electrodes for wrapping said both ends of said glass tube;
- a reflecting plate;
- a diffusing plate; and,
- a switching inverter connected to said external electrodes for applying square wave signals having a frequency of 100 kHz or lower to said external electrodes.

15. The backlight of claim 14, wherein said external electrodes of said external electrode fluorescent lamps are made of conductive transparent electrode materials.

16. The backlight of claim 14, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

17. A backlight, comprising:
- an upper substrate with an upper layer of fluorescent substance applied on a bottom surface of said upper substrate;
- a lower substrate with a lower layer of fluorescent substance applied on a top surface of said lower substrate, said lower substrate being installed to be opposite to said upper substrate;
- edge supporting stands interposed between said upper and lower substrates for hermetically sealing said upper and lower substrates;
- an array of a plurality of external electrode fluorescent lamps installed at a predetermined interval above said lower substrate, each of said fluorescent lamps including a glass tube into which a discharge gas is injected, wherein the inner peripheral wall of said glass tube is coated with a layer of fluorescent substance, and both ends of said glass tube are hermetically sealed;
- capsule type external electrodes for wrapping said both ends of said glass tube;
- electrodes formed at the corresponding outer surfaces on both sides of said assembled upper and lower substrates, respectively, and connected to electrode connecting lines to which an alternating current type power source is applied;
- a switching inverter connected to said electrodes for applying square wave signals having a frequency of 100 kHz or lower to said electrodes; and,
- a discharge gas injected into an inner space upon sealing said upper and lower substrates.

18. The backlight of claim 17, wherein said external electrode fluorescent lamps are not connected to said electrodes but disposed within said upper and lower substrates in a floating state.

19. The backlight of claim 17, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

20. The backlight of claim 17, wherein a square wave outputted from said switching inverter includes an overshooting.

21. A backlight, comprising:
- an upper substrate with an upper layer of fluorescent substance applied on a bottom surface of said upper substrate;
- a lower substrate installed to be opposite to said upper substrate and with a lower layer of fluorescent substance applied on a top surface of said lower substrate, said lower substrate being installed to be opposite to said upper substrate;
- edge supporting stands interposed between said upper and lower substrates for hermetically sealing said upper and lower substrates;
- multiple capsule type electrode structures, said multiple capsule type electrode structures being constructed by coupling upper and lower electrodes having surfaces coated with ferroelectrics and grooves at a predetermined interval, and being installed respectively on the inner portions at both ends of said lower substrate;
- a plurality of glass tubes in parallel coupled with said grooves of said multiple capsule type electrode structures installed respectively on the inner portions at both ends of said lower substrate, each of said glass tubes having a discharge gas injected therein, wherein the inner peripheral wall of said glass tubes coated with a layer of fluorescent substance, and both ends of said glass tube are hermetically sealed;
- electrode connecting lines connected to said multiple capsule type electrode structures;
- a switching inverter connected to said electrode connecting lines for applying a square wave signal having a frequency of 100 kHz or lower to said electrodes; and
- a discharge gas injected into an inner space upon sealing said upper and lower substrates.

22. The backlight of claim 21, wherein said switching inverter constitutes a bridge circuit by four FETs A, B, C and D wherein a DC is applied to the drains of said FETs A and C, sources of said FETs B and C are grounded, sources of FETs A and C are connected to the drains of said FETs B and D, respectively; and, a boosting transformer connected between a connection point of said FETs A and B and a connection point of said FETs C and D.

23. The backlight of claim 21, wherein a square wave outputted from said switching inverter includes an overshooting.

24. A drive method for driving a backlight with a plurality of external electrode fluorescent lamps interconnected in parallel, the method comprising the steps of:
- dividing said plurality of external electrode fluorescent lamps into a plurality of predetermined regions;
- connecting identical electrode connecting lines to external electrodes of said fluorescent lamps in said respective divided regions, respectively;
- connecting switching inverters for outputting square waves to said electrode connecting lines connected to said respective divided regions, respectively;
- applying an identical gate signal to each of said switching inverters; and
- supplying said electrode connecting lines with said in-phase square waves from said switching inverters in response to said gate signal.

25. The method of claim 24, wherein said switching inverter constitutes a bridge circuit by four FETs A, B, C and D wherein a DC is applied to the drains of said FETs A and C, sources of said FETs B and C are grounded, sources of said FETs A and C are connected to the drains of said FETs B and D, respectively; and, a boosting transformer connected between a connection point of said FETs A and B and a connection point of said FETs C and D.

* * * * *